United States Patent [19]

Risko et al.

[11] 4,118,598
[45] Oct. 3, 1978

[54] AMPLITUDE MODULATED IMPATT DIODE OSCILLATOR AND A LOW COST COMMUNICATION SYSTEM USING SAME

[75] Inventors: John Joseph Risko, Cranbury; Louis Sebastian Napoli, Hamilton Square, both of N.J.

[73] Assignee: RCA Corporation, New York, N.Y.

[21] Appl. No.: 616,887

[22] Filed: Sep. 25, 1975

[51] Int. Cl.² .......................... H03D 1/10; H04B 1/22
[52] U.S. Cl. ..................... 325/26; 325/105; 325/365; 329/205 R
[58] Field of Search ............... 325/26, 105, 125, 365; 329/205 R; 332/31 T; 331/107 R; 343/911 R

[56] References Cited

U.S. PATENT DOCUMENTS

| 3,430,249 | 2/1969 | Franks | 343/911 R |
|---|---|---|---|
| 3,659,204 | 4/1972 | Hufford | 325/26 |
| 3,673,515 | 6/1972 | Kersten et al. | 332/31 T |
| 3,882,419 | 5/1975 | Swartz | 331/107 R |

OTHER PUBLICATIONS

Kramer, "Impatt Diodes and Millimeter-Wave Applications Grow Up Together", Electronics, Oct. 11, 1971, pp. 78–81.
"Nonlinear Behavior and Bias Modulation of an Impatt Diode Oscillator", Chao and Haddad, IEEE Transaction on Microwave Theory and Techniques, vol. MTT-21, No. 10, Oct. 73.

*Primary Examiner*—Benedict V. Safourek
*Assistant Examiner*—Michael A. Masinick
*Attorney, Agent, or Firm*—Edward J. Norton; Robert L. Troike

[57] ABSTRACT

A low cost microwave communication system is described in which a transmitter including an IMPATT diode operating CW (Continuous Wave) is amplitude modulated by a video signal such that the radiated RF (radio frequency) output from the transmitter is directly proportional to the amplitude of the video signal. Low level radiated power from the transmitter is picked up by a receiver which includes a "square law" detector. The detector provides an output voltage according to the power level of the received RF signal.

9 Claims, 7 Drawing Figures

AMPLITUDE MODULATED IMPATT DIODE OSCILLATOR AND A LOW COST COMMUNICATION SYSTEM USING SAME

BACKGROUND OF THE INVENTION

This invention relates to IMPATT diode oscillators, the amplitude modulation of this type of oscillator, and to a low cost communications system including an amplitude modulated IMPATT diode oscillator. The terms IMPATT diode and IMPATT mode are described in an article entitled "Basic Principles and Properties of Avalanche Transit Time Devices" by Haddad et al in IEEE Trans. on Microwave Theory and Techniques, Vol. MTT-18, No. 11, Nov. 1970.

It is desirable for many applications that television video signals be sent over low cost and light weight microwave networks. One particular need is for use with a surveillance camera. Presently, cables are strung the 1000 feet or so between a camera and a monitor. To conceal this is costly. Also this wiring is not very practical where the system is to be moved often from one location to another. It is therefore desirable to braodcast these signals. A conventional video broadcast system includes costly and bulky signal processing structures in both the transmitter and receiver and the need for linear detectors.

BRIEF DESCRIPTION OF THE INVENTION

Briefly, a microwave communication system for broadcasting broadband video signals is described wherein an IMPATT diode is biased into oscillation by a current source which includes means responsive to the video signals to provide a power output variation proportional to the video signal. These amplitude modulated oscillations are radiated via an antenna. A second remotely located antenna receives these amplitude modulated oscillator signals at a low level and couples them to a square law detector. The square law detector in response to the received low level signals provides a voltage variable signal which is the reconstructed video signal.

IN THE DRAWINGS

A more detailed description follows in conjunction with the following drawings wherein.

DETAILED DESCRIPTION OF A PREFERRED EMBODIMENT

Figure 1:
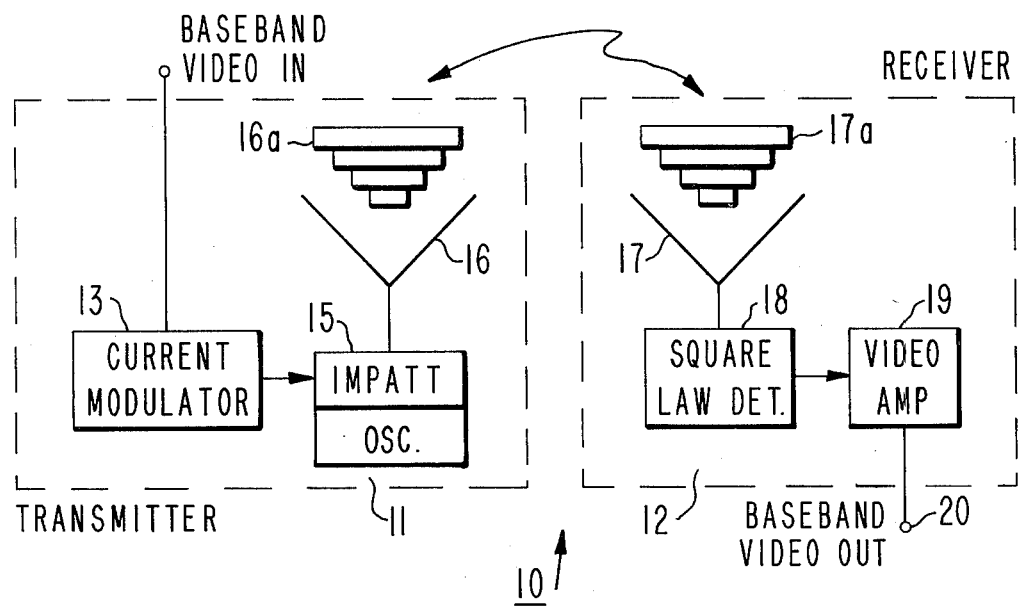
FIG. 1 is a block diagram of a communication system according to one embodiment of the invention.

Referring to FIG. 1, a block diagram of a low cost millimeter-wave communication system 10 is illustrated. The system is designed to broadcast television video information from a surveillance camera, for example, over a range of 1500 to 2000 feet to a remote site. The system comprises a transmitter 11 and a receiver 12. The transmitter includes a current modulator 13, an IMPATT oscillator 15 and an antenna 16. The receiver includes an antenna 17, a square law detector 18 and a video amplifier 19. The IMPATT oscillator 15 includes an IMPATT avalanche diode mounted in a waveguide cavity which is reverse biased into avalanche breakdown via modulator 13 so as to oscillate CW at a frequency of 31.1 GHz. The diode of the IMPATT oscillator 15 is, for example, a P-type silicon IMPATT diode such as that described by G. A. Swartz, Y. S. Chiang, C. P. Wen and A. Gonzalez, in an article entitled "Performance of P-type Epitaxial Silicon Millimeter-Wave IMPATT Diodes" published in IEEE Trans. Electron Devices, Vol. EP-21, pp. 165–171, Feb. 1974. When the IMPATT diode is biased into the avalanche breakdown region, the RF power output linearly increases as the bias current increases up to a certin value. See for example an article entitled "Avalanche Diode Microwave Oscillator and Amplifiers" by C. C. Shen et al in 6th International Conference on Microwave Generation and Amplification, Sept. 1966 - IEE Conference Publication 27 published by Institute of Electrical Engineers. The IMPATT diode 15 is operated in this linear region. For the particular diode used the bias voltage was −31 volts. The 4.5 MHz baseband video signal (0 to 4.5 MHz) from a surveillance camera is applied to modulator 13 at terminal 14. The modulator 13 in response to the voltage level of the video signal provides an increase or decrease in the bias current across the IMPATT diode which in turn causes amplitude modulation of the carrier wave from oscillator 15. The RF (radio frequency) power output from oscillator 15 is proportional to the video signal voltage. The amplitude modulated carrier waves are coupled to and are radiated by horn antenna 16. Placed forward of the horn 16 is a dielectric lens 16a which converts the spherical wavefront eminating from the horn 16 to a plane wavefront.

The radiated RF signal waves from transmitter 11 are picked up at antenna 17 and lens 17a of receiver 12 and are coupled by a waveguide section to a square law detector 18. The maximum power output from the IMPATT oscillator 15 which occurs at the sync pulse level is adjusted for example to be 200 milliwatts. The power level of the received signal about 1500 feet away is about 1 microwatt. Since the detector 18 is square law, the rectified output voltage from detector 18 is proportional to the power of the applied RF signal, providing a reconstruction of a video signal. A system as described above was constructed and tested. The phase and gain response of the overall system was found to be linear. There is a compression of the signal when transmitted which is exactly compensated by expansion of the signal in the square law detector when received. The video signal included color information and the color information was faithfully reproduced. This would not have been possible without phase and gain linearity over the overall system. The detected video signal is applied to and amplified to a usable level by video amplifier 19. The video signal is then applied to terminal 20.

Figure 2:
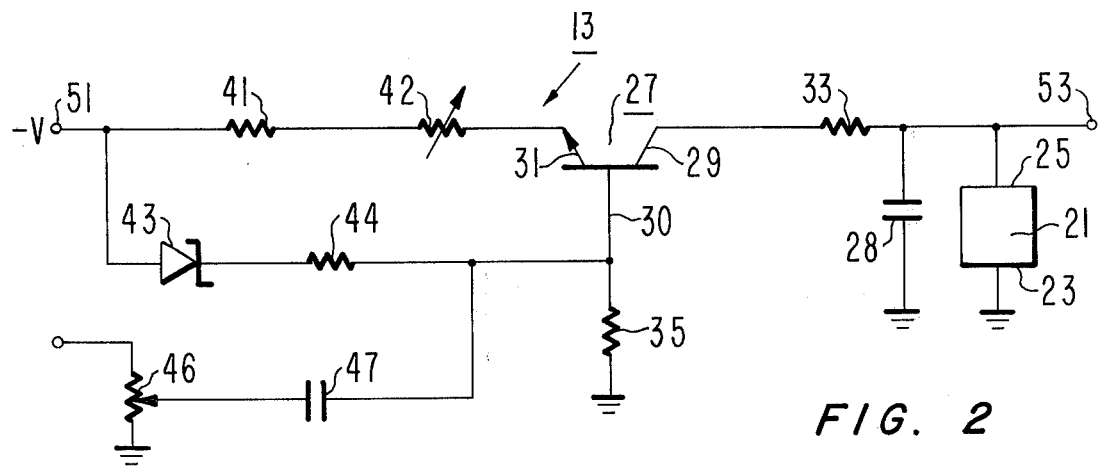
FIG. 2 is a schematic diagram of a current modulator useable in the system of FIG. 1.

The amplitude modulation of the IMPATT diode is accomplished by modifying a constant current source biasing the diode. FIG. 2 is a schematic diagram of an example of the modulator 13. Referring to FIG. 2, the IMPATT diode 21 is coupled at one end 23 to ground or reference potential and at the opposite end 25 to the biasing modulator 13. RF bypass is provided by capacitor 28. The modulator includes an NPN transistor 27 having the collector 29 coupled via resistor 33 to terminal 25 of diode 21. The base 30 of transistor 27 is coupled via resistor 35 to ground potential. The emitter 31 of transistor 27 is coupled via adjustable resistor 42 and resistor 41 to a source of negative potential (−V) at terminal 51. A Zener diode 43 and a resistor 44 are coupled in series as shown in FIG. 2 between the negative source of potential at terminal 51 and the base 30 of transistor 27.

Figure 3:
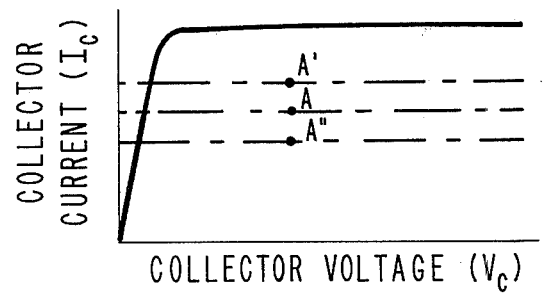
FIG. 3 is a plot of collector current vs. collector voltage for the modulator illustrated in FIG. 2.

The video signal is coupled across a tap resistor 46 and via a capacitor 47 to the base 30 of transistor 27. The resistor 46 presents a load to the video signal generator. This generator may be, for example, a model TC-1000 television camera sold by RCA Corporation, Lancaster, Pa. Resistor 46 is made adjustable so as to adjust the modulation level. The resistor 42 is made variable to adjust the current flow into the IMPATT diode 21. Resistor 41 is a current limiting resistor. The resistor 44 developes a voltage which adds and subtracts from the Zener diode voltage to thereby shift the load of transistor 31 as shown in FIG. 3 from A to A' to A", for example. The emitter-base voltage is determined by the Zener diode voltage and, therefore, the current through the transistor 31 in a steady state condition is determined by resistors 41, 42 and 33. Resistor 35 limits the current flow through the Zener diode 43 and biases the base 30 of the transistor 31. The resistor 33 is of a value to present a high impedance when the IMPATT diode is operating so that the video signal is not loaded down by the low impedance presented by the IMPATT diode during avalanche breakdown. Capacitor 47 is a coupling capacitor to couple the video signal across resistor 44. Resistor 44 develops the modulation current by effectively varying the Zener diode voltage used for clamping. The video signal essentially varies the Zener clamping voltage. The current otherwise remains constant maintaining the operating characteristic and RF power output from the IMPATT diode for a given level of video signal. A lossy ferrite bead may be placed along the collector output of transistor 31 to prevent bias circuit oscillations being coupled to the collector. By the above arrangement, the modulation level is made independent of variations in IMPATT voltage and, therefore, the system is independent of temperature changes in the IMPATT diode. The output from the IMPATT diode 21 is coupled via a waveguide terminal 53 to the horn antenna 16.

The circuit elements of the modulator of FIG. 2 described above and operated in the system of FIG. 1 had the following values:

| | |
|---|---|
| Zener 43 - 14 Volt breakdown | UZ 815 |
| Transistor 27 | 2N3055 |
| Resistors 33 and 44 | 220 ohms |
| Resistor 35 | 1500 ohms |
| Resistor 41 | 10 ohms |
| Resistor 42 | variable about 550 ohms |
| Resistor 46 | 30 ohms |
| Capacitor 47 | 100 microfarads |
| Voltage at terminal 51 is | 55 volts |

Figure 4:
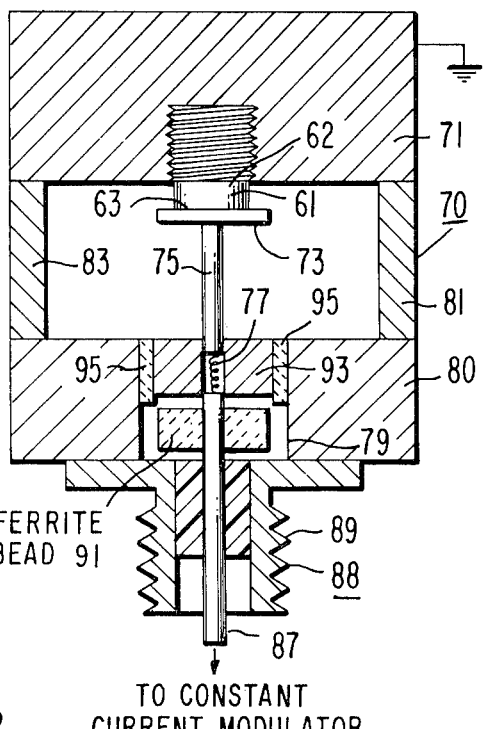
FIG. 4 is a cross-sectional view of an assembled waveguide mounted IMPATT diode.

Referring to FIG. 4, there is illustrated an example of how the IMPATT diode 61 is coupled in the waveguide. The waveguide 70 is formed by top wall 71 spaced from bottom wall 80 by side walls 81 and 83. The IMPATT diode 61 extends from the top wall 71 of waveguide 70 toward bottom wall 80. The cathode end 62 of the IMPATT diode 61 is mounted to a heat sink and to a point of ground or reference potential via the top wall 71. The anode end 63 of the IMPATT diode 61 has a circular conductive disc 73 pressed adjacent thereto by a spring loaded conductive probe 75. The probe 75 extends between the disc 73 and a spring 77 located in an aperture 79 in the bottom wall 80. The spring 77 is coupled to the center conductor 87 of a coaxial line 88. The outer conductor 89 of coaxial line 88 is coupled to the bottom wall 80 of the waveguide 70. At aperture 79 in the bottom of waveguide wall 80 is inserted the center conductor 87 and a portion of probe 75. A ferrite bead 91 extends about the center conductor 87 in aperture 79. Surrounding and electrically connected to spring 77 and a portion of probe 75 is a conductive block 93. The conductive block 93 is spaced inside aperture 79 by a body 95 of mylar from the bottom wall 80 of waveguide 70. The capacitance formed between block 93 and the bottom wall 80 provides the RF bypass of signals coupled along probe 75 and spring 77. This capacitance is represented by capacitor 28 in FIG. 2. The biasing current from modulator 13 is applied across the coaxial line 88 and is coupled to the IMPATT diode 21 via spring 77, probe 75 and disc 73. The modulated CW signals from the IMPATT diode are coupled along probe 75 and disc 73 and radiated into the waveguide 70. The RF microwave signals are then propagated along the waveguide 70 to the horn antenna 16, as illustrated in FIG. 1.

Figure 5:
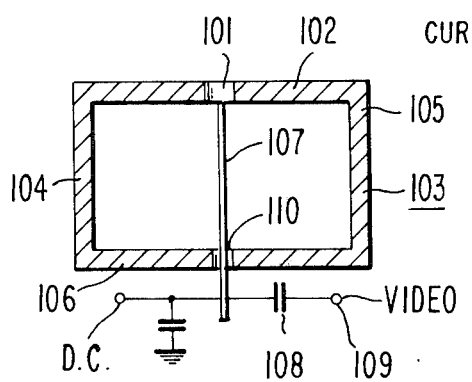
FIG. 5 is a cross-sectional view of a waveguide mounted detector diode package.

The square law detector in the receiver of the system described herein includes a point contact diode mounted in a coaxial package. The diode and package is sold as 1N53A rectifying diode. The D.C. bias level to this diode is about 0.2 to 0.3 volts. Referring to FIG. 5, the 1N53A diode and package 101 is mounted in the top wall 102 of a waveguide 103. The waveguide 103 also includes narrow walls 104 and 105 and a second broad wall 106. The waveguide 103 is coupled to the receiver horn. The center conductor of the coaxial package is insulated from the waveguide walls and the outer conductor is electrically connected to a broad wall 102. A conductive probe 107 is connected to and extends from the center conductor of the coaxial package. The probe 107 extends into the waveguide 103 in a manner to pick up RF signal waves propagating therealong. The probe 107 extends through an aperture 110 in the broad wall 106. D.C. bias for the diode is coupled via this conductive probe 107. The rectified output signal is taken across the rectifying diode by coupling the output from probe 107 via capacitor 108 to terminal 109. Although a diode is used herein as the detector, any typical rectifier will act as a square law detector when the applied signal is small.

Figure 6:
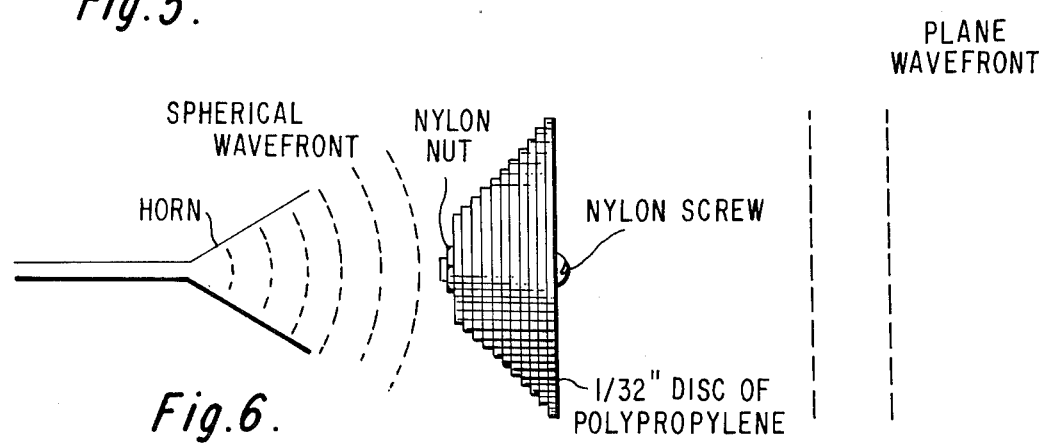
FIG. 6 is a sketch of an assembled dielectric lens and horn antenna.

Forward of the horn antenna 16 is placed a dielectric lens which converts the spherical wavefront in the horn as illustrated in FIG. 6 to a plane wavefront. The dielectric lens is made up of a series of 1/32 inch circular discs of polypropylene of a dielectric constant of 2.25. The discs are arranged so that the outline of the lens is made to conform to the theoretical outline of the lens described by, $$R = \frac{(n-1)f}{n \cos \theta - 1}$$

where
f = focal length

Figure 7:
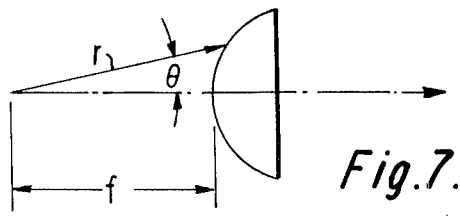
FIG. 7 is a sketch illustrating the parameters of a lens design.

R = lens radius
θ = degrees as illustrated in FIG. 7
n = $\sqrt{\epsilon\gamma} = \sqrt{2} = 1.414$ The discs in the above system are:

| Number of Discs | Size |
|---|---|
| 1 | 5 18/32″ Diam. |
| 3 | 5″ Diam. |
| 5 | 4″ Diam. |
| 7 | 3 1/2″ Diam. |
| 5 | 2″ Diam. |
| 2 | 1 1/2″ Diam. |

These discs are arranged in the order of their size and are held in place by a nylon screw and bolt with the screw extending through the center of the discs and bolted at the one end as shown in FIG. 6.

The process of making the dielectric lens comprises the steps of forming a plurality of dielectric discs, forming a hole in the center of the discs, and assembling the discs by passing a dielectric fastener through the center of the discs.

What is claimed is:

1. A microwave communications system for broadcasting and receiving video signals, comprising:
   an IMPATT diode oscillator for generating RF carrier frequency signals, said oscillator including an IMPATT diode and means for biasing said IMPATT diode into the avalanche region where the output power of the RF signal is linearly proportional to current,
   current modulator means coupled to said IMPATT diode and responsive to said video signals for changing the current through said IMPATT diode to provide an RF power output proportional to the voltage level of said video signals and an envelope amplitude proportional to the square root of the video signal,
   means coupled to said oscillator for radiating the varying power level signals from said oscillator,
   means remotely located from said radiating means for receiving said radiated varying power level RF signals, and
   means including only a square law detector coupled to said receiving means and responsive to said varying power level RF signals for providing voltage variable signals proportional to the square of the input voltage which constitute the reconstructed video signal compensated for the compression of the signal in the modulator to thereby provide an overall linear system.

2. The combination claimed in claim 1 wherein said modulator means includes means for providing constant current through said IMPATT diode in the absence of a change in the level of the video signal.

3. The combination of claim 2 wherein said modulator means includes a transistor having its emitter adapted to be coupled to a source of potential, its collector coupled to said IMPATT diode and a Zener diode coupled between the emitter and base.

4. The combination of claim 3 wherein a resistor is coupled in series with said Zener diode between said base and emitter of said transistor and said video signal is coupled across said resistor to thereby vary the current through said IMPATT diode and vary the RF power level from the oscillator.

5. The combination claimed in claim 4 wherein said radiating means includes a horn antenna.

6. The combination claimed in claim 5 wherein said radiating means includes a dielectric lens mounted on the free space end of said horn antenna in a manner to transmit waves with a plane wavefront.

7. A microwave communications system for transmitting and receiving signals amplitude modulated with a signal containing intelligence comprising:
   a microwave oscillator for generating RF carrier frequency signals, said oscillator being of the type where the output power of the RF microwave signal is linearly proportional to input current,
   current modulator means coupled to said oscillator and responsive to intelligence signal for changing the current input to said microwave oscillator to provide RF power output proportional to the voltage level of the intelligence signal and an envelope amplitude proportional to the square root of the intelligence signal,
   means coupled to said oscillator for radiating the varying power level RF signals from said oscillator,
   means remotely located from said radiating means for receiving said radiated varying power level RF signals and
   means including only a square law detector coupled to said receiving means and responsive to said varying power level RF signals for providing voltage variable signals proportional to the square of the input voltage which constitute the reconstructed intelligence signal compensated for the compression of the signal in the modulator to thereby provide an overall linear system.

8. A microwave device for transmission of microwave signals amplitude modulated with a signal containing intelligence comprising,
   an IMPATT diode,
   means for biasing said IMPATT diode into the avalanche region where the output power of the microwave signal is linearly proportional to current,
   said biasing means including means for providing in the absence of a change in said intelligence signal constant current to said IMPATT diode,
   said biasing means including a transistor having its emitter adapted to be coupled to a source of potential, its collector coupled to said IMPATT diode, and a zener diode and a resistor coupled in series between the base and emitter electrodes of said transistor, said intelligence signal being coupled across said resistor and responsive to the voltage level thereof to thereby vary the current thru said IMPATT diode and provide an RF power output proportional to the voltage level of the intelligence signal.

9. The combination of claim 8 wherein said intelligence signal is a television video signal.

* * * * *